United States Patent
Matzdorf et al.

(10) Patent No.: US 10,351,715 B2
(45) Date of Patent: Jul. 16, 2019

(54) SYNERGISTIC METAL POLYCARBOXYLATE CORROSION INHIBITORS

(71) Applicants: Craig Matzdorf, Hollywood, MD (US); Frank Pepe, California, MD (US); Michael Brindza, Leonardtown, MD (US); Joshua Walles, California, MD (US)

(72) Inventors: Craig Matzdorf, Hollywood, MD (US); Frank Pepe, California, MD (US); Michael Brindza, Leonardtown, MD (US); Joshua Walles, California, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/474,374

(22) Filed: Mar. 30, 2017

(65) Prior Publication Data

US 2018/0282555 A1    Oct. 4, 2018

(51) Int. Cl.
| | |
|---|---|
| *C09D 5/08* | (2006.01) |
| *C09D 163/00* | (2006.01) |
| *C09D 175/04* | (2006.01) |
| *C09D 179/08* | (2006.01) |
| *C09D 7/63* | (2018.01) |
| *C23F 11/08* | (2006.01) |
| *C23F 11/12* | (2006.01) |
| *C10M 141/02* | (2006.01) |
| *C10M 141/12* | (2006.01) |
| *C10M 129/34* | (2006.01) |
| *C08K 5/098* | (2006.01) |

(52) U.S. Cl.
CPC .............. *C09D 5/086* (2013.01); *C09D 7/63* (2018.01); *C09D 163/00* (2013.01); *C09D 175/04* (2013.01); *C09D 179/08* (2013.01); *C10M 129/34* (2013.01); *C10M 141/02* (2013.01); *C10M 141/12* (2013.01); *C23F 11/08* (2013.01); *C23F 11/124* (2013.01); *C08K 5/098* (2013.01); *C10M 2207/027* (2013.01); *C10M 2207/123* (2013.01); *C10M 2207/142* (2013.01); *C10M 2217/0453* (2013.01); *C10M 2217/0465* (2013.01); *C10N 2210/02* (2013.01); *C10N 2230/12* (2013.01); *C10N 2250/10* (2013.01); *C10N 2250/121* (2013.01)

(58) Field of Classification Search
CPC ..................................................... C09D 5/086
See application file for complete search history.

(56) References Cited

U.S. PATENT DOCUMENTS

| | | | | |
|---|---|---|---|---|
| 5,034,443 A | * | 7/1991 | Bae .................. | C01B 11/18 252/400.3 |
| 5,176,894 A | | 1/1993 | Sinko | |
| 5,212,261 A | | 5/1993 | Stierman | |
| 5,225,108 A | * | 7/1993 | Bae .................. | C01B 11/18 252/400.3 |
| 5,795,661 A | * | 8/1998 | Taffinger ............. | C23C 22/46 148/246 |
| 5,948,147 A | | 9/1999 | Sinko | |
| 7,846,503 B2 | * | 12/2010 | Stark ................ | C23C 18/1617 427/345 |
| 8,932,563 B2 | * | 1/2015 | Martinetti ............ | A61K 8/02 424/401 |
| 2006/0045854 A1 | * | 3/2006 | Zaidel ................. | A61K 8/0208 424/53 |
| 2008/0110891 A1 | * | 5/2008 | Carballido ........... | B65D 41/125 220/309.1 |
| 2011/0247756 A1 | * | 10/2011 | Wilson ................ | C08G 59/4014 156/307.7 |
| 2011/0306699 A1 | * | 12/2011 | Whang ................ | A01N 59/16 523/113 |
| 2012/0208941 A1 | * | 8/2012 | Reith ................. | C08K 3/18 524/403 |
| 2013/0344310 A1 | * | 12/2013 | Wasserfallen ........ | B05D 7/142 428/216 |
| 2014/0097231 A1 | * | 4/2014 | Hirao ................. | B23K 35/365 228/176 |
| 2014/0121311 A1 | * | 5/2014 | Bravo ................. | C09D 7/60 524/276 |
| 2014/0238482 A1 | * | 8/2014 | Ichibayashi ......... | C07C 13/64 136/256 |
| 2014/0275345 A1 | * | 9/2014 | Williams ............. | C08F 124/00 523/445 |
| 2015/0004105 A1 | * | 1/2015 | Edwards ............ | A61K 8/345 424/52 |
| 2016/0234943 A1 | * | 8/2016 | Chung ................ | H01B 1/22 |
| 2017/0333310 A1 | * | 11/2017 | Subramanyam ...... | A61K 8/27 |

FOREIGN PATENT DOCUMENTS

WO    PCT/US17/63346    11/2017

* cited by examiner

*Primary Examiner* — Megan McCulley
(74) *Attorney, Agent, or Firm* — Mark O. Glut; NAWCAD

(57) ABSTRACT

The invention comprises synergistic compositions of at least two metal carboxylates as corrosion inhibitors based on polycarboxylate anions and a variety of different cations. The inhibitors are designed to be added to film forming or other compositions to reduce the corrosion of the metal substrate on which the synergistic compositions are applied.

2 Claims, 3 Drawing Sheets

SYNERGISTIC METAL POLYCARBOXYLATE CORROSION INHIBITORS

ORIGIN OF INVENTION

The invention described herein was made by employee(s) of the United States Government and may be manufactured and used by or for the Government for governmental purposes without the payment of any royalties thereon or therefor.

FIELD OF THE INVENTION

The present invention is directed to a synergistic composition comprised at least two different metal polycarboxylates and to the method for its use in preventing or inhibiting corrosion of metals.

BACKGROUND OF THE INVENTION

Metals are susceptible to corrosion. Atmospheric corrosion is of particular concern. For example, when polymer coatings such as paints or sealants are applied to the metal, corrosion of the underlying metal may cause a loss of adhesion between the polymer coating and the base metal. A loss of adhesion between the coating and the base metal may similarly lead to corrosion of the metal. Aluminum alloys frequently require corrosion protection and improvements in adhesions between the base aluminum and subsequent coatings.

Generally, corrosion processes describe the oxidation of metal at its surface which acts to weaken and/or disfigure the metal. Most metals are active enough to be converted to their oxides, and it is generally accepted that corrosion occurs by electrochemical action involving the creation of small galvanic cells on the surface of the metal. More specifically, this invention is directed to compositions comprising corrosion inhibitors based on polycarboxylic anions and a variety of cations. The inhibitors are designed to be added to film forming or other compositions to reduce the corrosion of the metal substrate on which the materials are applied. Individual polycarboxylate compounds show corrosion inhibition for selected metals like steel or aluminum, in certain accelerated corrosion tests, but none are effective for multiple accelerated corrosion tests. It was discovered that specific combinations of polycarboxylate metal salts provided synergistic corrosion inhibition that would not be predicted by the performance of the individual salts. The novel feature of this invention is the combination of multiple metal polycarboxylate compounds, with the same or varying cations, to provide superior corrosion resistance compared to the individual carboxylate compounds. In addition, the corrosion resistances of coatings using active aluminum alloy pigments are enhanced by the synergistic combination of two or more polycarboxylate metal salts.

The prior art demonstrates corrosion inhibition by individual mono- and polycarboxylate compounds as additives to protective coatings but their performance is limited. None of the prior art predicts the synergistic effects obtained by two or more specific metal polycarboxylates. For example, compositions based on hexavalent chromium, like zinc chromate, barium chromate and strontium chromate, are superior corrosion inhibitors and have been used for approximately 100 years to protect aircraft and other valuable assets which would otherwise corrode more quickly in the environment. Protective primers used in naval aviation, according to the materials specifications MIL-PRF-85582, MIL-PRF-23377 and TT-P-2760, describe and qualify coatings based on chromate inhibitors. Although chromate-based inhibitors are technically excellent, the hexavalent chromium species is a known carcinogen and has been targeted for replacement since the early 1970's. Corrosion inhibitors based on non-chromate compounds have been implemented but are to date less effective for protecting various metals such as steel, aluminum and its alloys.

SUMMARY OF INVENTION

This invention comprises synergistic compositions of corrosion inhibitors based on polycarboxylic acids and a variety of cations. The inhibitors are designed to be added to film forming or other compositions to reduce the corrosion of the metal substrate on which the materials are applied. Individual polycarboxylate compounds show corrosion inhibition for selected metals like steel or aluminum, in certain accelerated corrosion tests, but none are effective for multiple metals or in multiple accelerated corrosion tests. It was discovered that specific combinations of certain polycarboxylic metal salts provided synergistic corrosion inhibition that would not be predicted by the performance of the individual compounds.

The novel feature of this invention is the combination of multiple metal polycarboxylate compounds, with varying anions and cations, to provide superior corrosion resistance compared to the individual compounds. In addition, the corrosion resistances of coatings using active aluminum alloy pigments are enhanced by the use of at least two different synergistic metal polycarboxylates.

DETAILED DESCRIPTION OF THE INVENTION

Figure 1:
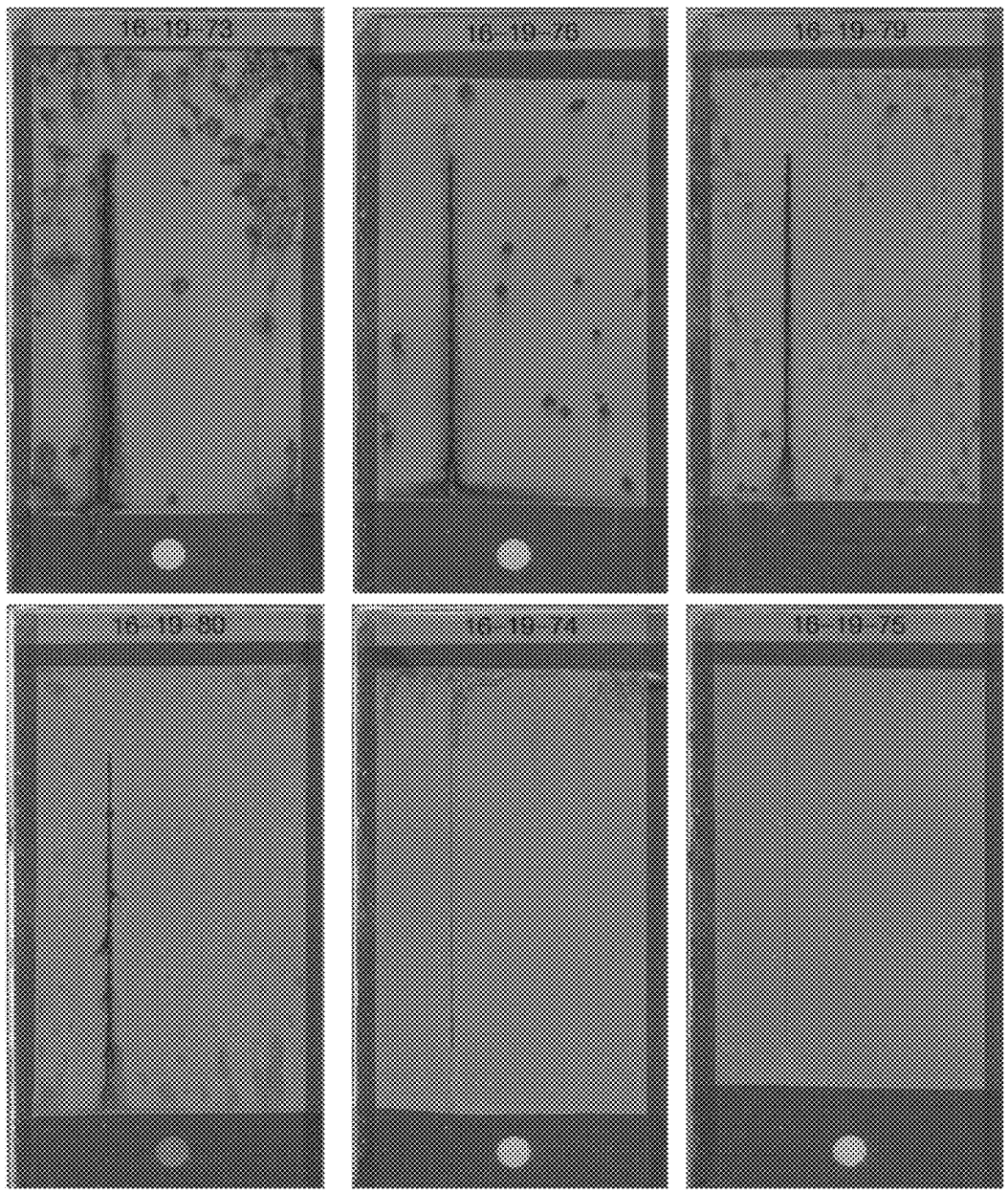
FIG. 1: Performance of LP-6 aluminum rich primer by itself and with various zinc dicarboxylate compounds after 29 cycles (days) in GMW 14872 (from left to right in top row: LP6-F control (no inhibitors), LP6-F with zinc oxalate, LP6-F with zinc succinate; bottom row: LP6-F with zinc tartrate and LP6-F with zinc citrate, LP6-F with a blend of zinc oxalate and zinc citrate).

The present invention relates to synergistic metal polycarboxylate combinations and to a method of treating metal to improve the metal's corrosion resistance. The method includes applying, to the surface of a metal, a coating or binder which comprises an effective amount of a synergistic mixture of metal polycarboxylates. More specifically, the subject invention is a synergistic blend of corrosion inhibitors, consisting of at least two different metal carboxylates. Anions, such as polycarboxylics chosen from linear and branched aliphatic molecules like oxalate, tartrate, succinate, and adipate, and aromatic molecules like phthalate, diphenate, mellitate and trimellitate. These are examples of some molecules. There are many other polycarboxylics acids which can be used for preparing the synergistic combination.

The cations, for example include elements chosen from: Group Ia—Lithium, potassium and sodium, Group IIa—Magnesium, calcium, strontium, and barium, Group IIIb—Scandium, yttrium, lanthanum and the other lanthanides like cerium, praseodymium, neodymium, samarium, europium, gadolinium, etc., Group IVb—Titanium and zirconium, Group Vb—Vanadium and niobium, Group VIb—Chromium and molybdenum, Group VIIb—Manganese, Group VIII—Iron, cobalt and nickel, Ib—Copper, Group IIb—Zinc, Group IIIa—Aluminum, and Group Va—Bismuth.

The choice of cations and anions will influence water and organic solvent solubility which needs to be considered for the application of interest. Table 1 and 2 are examples of water solubility and solubility products for combinations of cations and anions. Inhibitors may be blended using the same metal, for example, zinc citrate and zinc oxalate, or they may be blended with different cations with the same or different anions, for example magnesium oxalate and zinc oxalate.

At least two metal polycarboxylate inhibitors are blended with different molar ratios ranging from 0.1 to 20 parts by weight of each of the two metal carboxylates to obtain the maximum synergistic performance for a particular application. Inhibitors are used at varying concentrations in the particular vehicle or binder for the application. This may range from relatively low concentrations of a few weight percent, e.g., from 0.1 up to very high concentrations of 30 weight percent or parts by weight in the binder.

The synergistic corrosion inhibitors may be combined in bulk after synthesis, or they may be blended during synthesis. For example, additional or different synergistic effects may be garnered by reacting oxalic acid with zinc nitrate and magnesium nitrate to achieve a compound with a mixed complex of zinc and magnesium oxalate. The solubility and corrosion-inhibiting properties of this compound can be different than the combination of separately synthesized zinc oxalate and magnesium oxalate compounds. Various synergistic combinations of polycarboxylate anions and cations, per the above show improved corrosion inhibition.

TABLE 1

Water solubility of selected compounds

Chemical Solubility g/100 mL, @ 20 C. unless noted

| Anion | Zn | Mg | Ca | Mn | Sr | Ba | Ce | Pr | Y | Li |
|---|---|---|---|---|---|---|---|---|---|---|
| Citrate | Insol in water | Sol in water @ 298 K nonahydrate 0.0482/ tetradecahydrate 0.0446 | 0.08496 @ 18 & 0.0959 @ 25 | | | 0.0406 g @ 18 & 0.0572 g @ 25 | 0.3 | | | 61.2 @ 15 |
| Oxalate | $6.4 \times 10^{-4}$ @ 18 & $7.15 \times 10^{-4}$ @ 26 | 0.03 @ 18 | $6.8 \times 10^{-4}$ | Slightly Sol in water | 0.00461 @ 18 | 0.0022 | $4.1 \times 10^{-5}$ @ 25 | $7.4 \times 10^{-5}$ @ 25 | 0.0001 g @ 25 | Sol in 15 parts water |
| Nitrate | 118.3 | 69.5 | 129.3 | 57.33 @ 18 & 62.37 @ 25 | 70.5 | 9.2 | | | | 50.9 @ 25 |
| Succinate | | 24.35 @ 15 & 66.36 @ 100 | 1.276 | | 0.270 | 0.418 | | | | |
| Tartrate | 0.022 g & 0.041 @ 85 | | 0.0475 | | 0.200 | 0.0279 | 0.005 @ 25 | | | 0.079 @ 0 |
| Carbonate | 0.0206 @ 25 | 26 w/ CO2 saturation in water | 0.0065 | 0.0065 @ 25 | $1.09 \times 10^{-3}$ @ 24 | 0.0022 | Almost Insol in Water | | Insol in water | 1.33 |
| Chloride | 432 g/100 g @ 25 & 614 g/ 100 g @ 100 | 54.5 | 74.5 | 73.9 | 52.9 | 35.7 | 3 | 50.96 @ 13 | Sol in water. | 78.5 |
| Benzoate | 2.49 @ 17 & 2.41 @ 27.8 | 6.16 @ 15 & 19.6 @ 100 | 3.02 @ 26 | 5.4 @ 24.7 | 4.3 g @ 15 & 10.1 g @ 100 | | | | 40 @ 100 | |
| Malate | | | 0.9214 @ 18 & 0.8552 @ 25 | | 0.448 | 0.883 | | | | |

TABLE 2

Solubility products for selected compounds

| Chemical Solubility $K_{SP}$, @ 25 C. unless noted | Cation | | | | | | | | | |
|---|---|---|---|---|---|---|---|---|---|---|
| Anion | Zn | Mg | Ca | Mn | Sr | Ba | Ca | Pr | Y | Li |
| Citrate | | | | | | | | | | |
| Oxalate | 1.38 × 10^−9 (dihydrate) | 4.83 × 10^−8 (dihydrate) | 2.32 × 10^−9 (mono hydrate) | 1.70 × 10^−7 (dihydrate) | | | | | | |
| Nitrate | | | | | | | | | | |
| Succinate | | | | | | | | | | |
| Tartrate | | | | | | | | | | |
| Carbonate | 1.48 × 10^−10 (anhydrous) 5.42 × 10^−11 (mono) | 2.38 × 10^−6 (trihydrate) 6.82 × 10^−6 | 3.36 × 10^−9 (Calcite) | 2.24 × 10^−11 | 5.60 × 10^−10 | 2.58 × 10^−9 | | | 1.03 × 10^−31 | 8.15 × 10^−4 |
| Chloride | | | | | | | | | | |
| Benzoate | | | | | | | | | | |

Composition Examples and Performance Data of Synergistic Combinations of Metal Carboxylates Zinc tartrate, zinc succinate and zinc adipate were synthesized by Materials Engineering Division personnel as follows:

EXAMPLE

For a proof of principle synthesis 0.02 moles of the organic acid was dissolved in 30-100 milliliters of deionized/distilled water. NaOH was added to the mixture in equivalent molar ration to the number of carboxylate groups (0.04 moles for the di-carboxylates). The mixture was brought up to boiling temperature and refluxed for 3-6 hours. An equivalent molar ratio of Zinc Nitrate Hexahydrate was added to the reaction mixture. With 1-2 additional hours at reflux, all mixtures precipitated out a white crystalline product, which was vacuum filtered, dried and removed from filter paper. Infrared Spectroscopy of zinc tartrate confirmed the product against the spectrum published in the literature, and spectra of zinc succinate and adipate confirmed reaction completion by lack of remaining acid.

Successful scale-up reactions up to 10 times (2.0 moles) the initial amount of reactants were performed. Reactions yielded greater than 90% product by mass in most cases.

Drying the salts above 120 degrees Celsius overnight was sufficient to remove most residual water, as confirmed by TGA measurements. No significant mass loss was observed below 250 degrees Celsius.

This simple reaction scheme is expected to produce the metal salt of any polycarboxylic acid provided the following are true: The acid is water soluble, the metal cation exists as a soluble reactant compound (such as zinc nitrate), and the product of the metal cation and carboxylate anion has low enough solubility as to precipitate out a majority of the product in water.

Zinc oxalate, zinc tartrate, zinc succinate, zinc citrate, and a blend of zinc oxalate and zinc citrate were added to a base formulation of aluminum rich primer, LP6-F, which contains a two-component epoxy resin system, an epoxy modifier, solvents and Al—Zn—In powder. Wet primers were spray applied to zinc phosphate coated 1010 steel and 2024-T3 aluminum coated with MIL-DTL-81706 Type II "TCP" conversion coating. After curing, test panels were scribed and exposed to either ASTM B117 neutral salt fog or GMW 14872 cyclic corrosion tests.

FIG. 1 shows the performance of the coatings on steel after 29 cycles (days) of the GMW 14872 test. It is clear that each inhibitor by itself improves the corrosion resistance of the LP6-F control, and that each inhibitor has different effectiveness, with the zinc oxalate being the least effective and the zinc citrate the most effective. The combination of zinc oxalate and zinc citrate, however, provides unexpected superior corrosion inhibition that is significantly better than either zinc compound by itself. Ratings shown in Table 3 reflect clearly what is seen in FIG. 1.

TABLE 3

Standing rating data for images in FIG. 1

| 1st Digit-Scribe Appearance | 2nd Digit-Corrosion (ASTM D1654) | 3rd/4th Digit-Rusting (ASTM D610) | | |
|---|---|---|---|---|
| 0 Bright and clean | 0 No lifting of coating | 0 | >50% | G: General |
| 1 Bright with very slight staining | 1 Lifting or loss of adhesion up to 1/64" (0.5 mm) | 1 | >33% | S: Spot |
| 2 Lusterous with moderate staining | 2 Lifting or loss of adhesion up to 1/32" (1.0 mm) | 2 | >16% | P: Pinpoint |
| 3 Loss of luster, no product build up | 3 Lifting or loss of adhesion up to 1/16" (2.0 mm) | 3 | >10% | |
| 4 Heavy staining, minor corrosion no product build up | 4 Lifting or loss of adhesion up to 1/8" (3.0 mm) | 4 | >3% | |
| 5 Heavy staining, minor corrosion product build up | 5 Lifting or loss of adhesion up to 3/16" (5.0 mm) | 5 | >1% | |
| 6 Moderate corrosion product build up | 6 Lifting or toss of adhesion up to 1/4" (7.0 mm) | 6 | >0.3% | |
| 7 Major corrosion product build up | 7 Lifting or loss of adhesion up to 3/8" (10.0 mm) | 7 | >0.1% | |

TABLE 3-continued

Standing rating data for images in FIG. 1

| 8 Severe corrosion product build up | 8 Lifting or loss of adhesion up to 1/2" (13.0 mm) | 8 | >0.03% |
| 9 Complete liting of coating above rust around scribe | 9 Lifting or loss of adhesion up to 5/8" (16.0 mm) | 9 | >0.01% |
| 10 Total consumption of coating around scribe | 10 Lifting or loss of adhesion over 5/8" (>16.0 mm) | 10 | 0.00% |

| | 1st Digit Scribe | 2nd Digit Corrosion | | 3rd Digit: Rusting, Front | | |
| --- | --- | --- | --- | --- | --- | --- |
| Panel Number | Appearance | Reading | Isolated | Rating | Isolated | Notes - Comments |
| 16-19-73 | 7 | 4 | | 3-G | | |
| 16-19-74 | 3 | 2 | | 10 | | Crevice Corrosion Along Top Tape Edge |
| 16-19-75 | 2 | 0 | | 10 | | Slight Crevice Corrosion Along Top Tape Edge, Best of |
| 16-19-76 | 5 | 0 | | 5-G | | |
| 16-19-77 | 5 | 1 | | 5-G | | |
| 16-19-78 | 5 | 0 | 2 | 5-G | | |
| 16-19-79 | 4 | 0 | | 6-P | | |
| 16-19-80 | 5 | 2 | | 3-G | | |
| 16-19-81 | 6 | 3 | | 10 | | Corrosion Eruption in Lower Left Corner |
| 16-19-82 | 6 | 0 | | 10 | | |
| 16-19-83 | 6 | 0 | | 10 | | |
| 16-19-84 | 6 | 2 | | 10 | 1 spot | |

Figure 2:
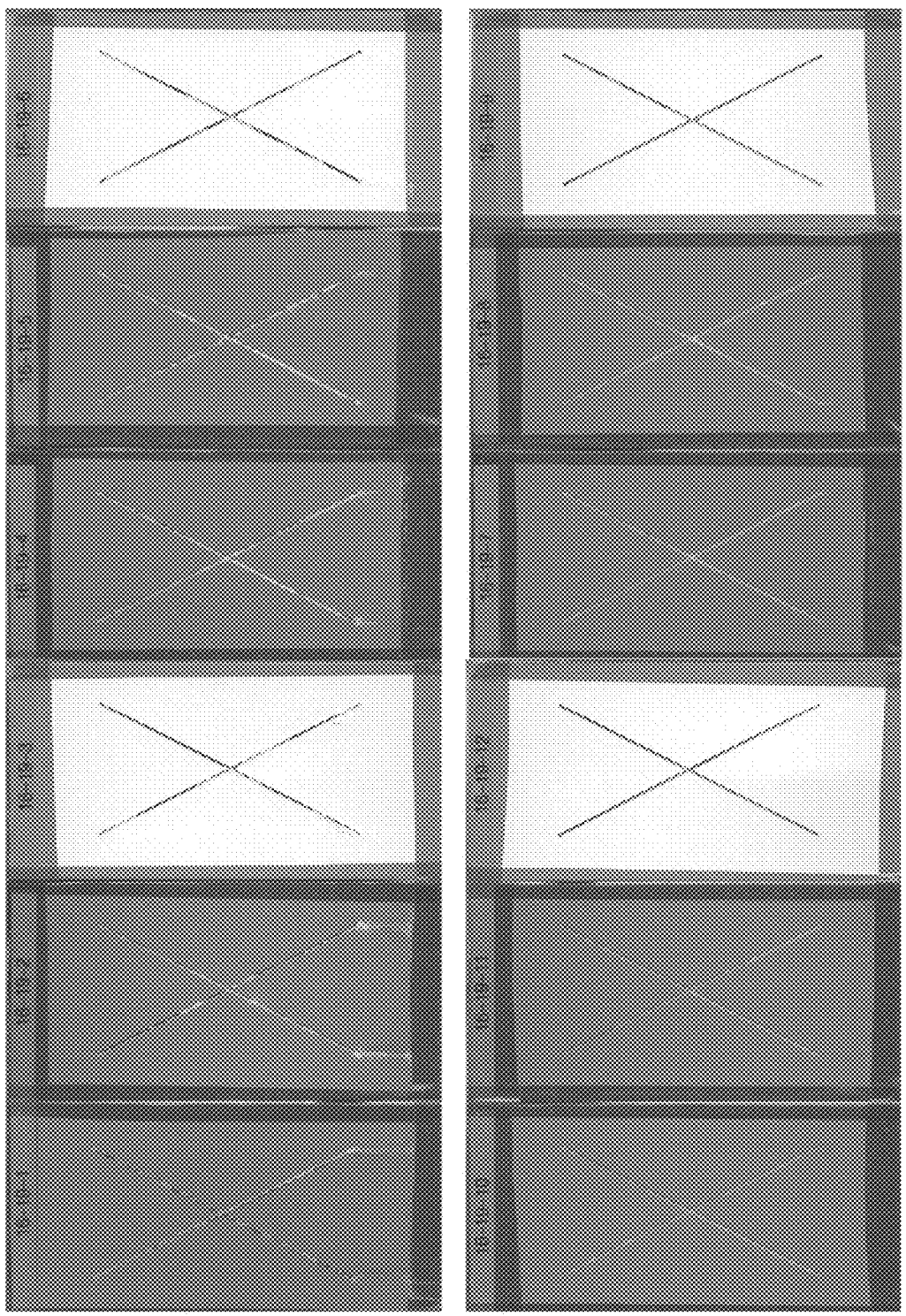
FIG. 2: Performance of LP-6 aluminum rich primer by itself and with various zinc dicarboxylate compounds after 3 weeks in ASTM B117 (from left to right in top row: LP6-F control (no inhibitors), LP6-F with zinc citrate; bottom row: LP6-F with zinc oxalate, LP6-F with blend of zinc oxalate and zinc citrate).
Figure 3:
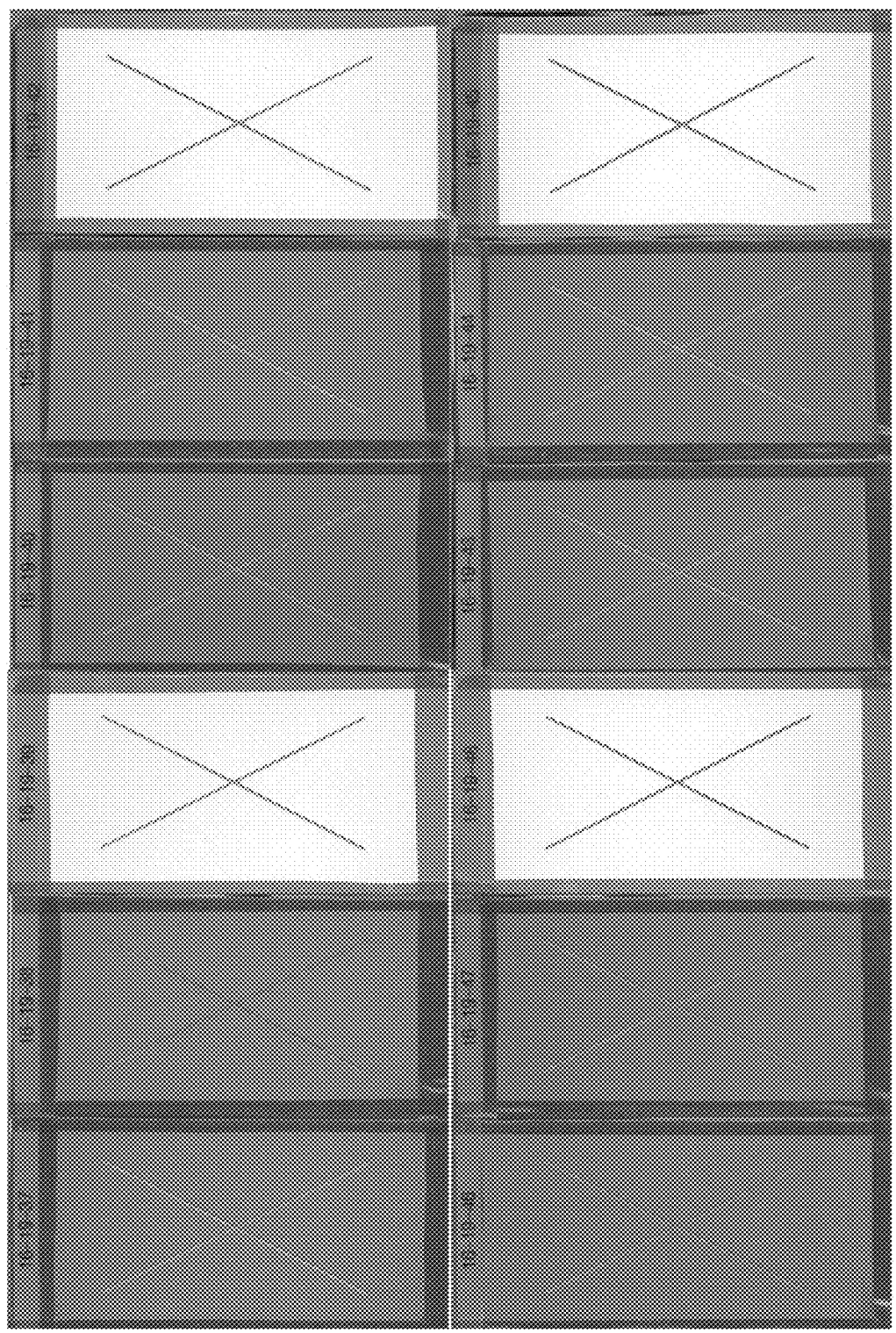
FIG. 3: Performance of LP-6 aluminum-rich primer by itself and with various zinc dicarboxylate compounds after 3 weeks in GMW 14872 (from left to right in top row: LP6-F control (no inhibitors), LP6-F with zinc citrate; bottom row: LP6-F with zinc oxalate, LP6-F with blend of zinc oxalate and zinc citrate).

Similar synergistic performance is seen for the zinc citrate/zinc oxalate blend for the LP6-F primer on aluminum. FIGS. 2 and 3 show comparative images for the control and inhibited versions after 3 weeks exposure in ASTM B117 and GMW 14872, respectively. For the blend in FIG. 2, the synergistic performance can best be seen by looking at the scribed area of the topcoated (white) panels. For the control and zinc citrate, there is significant white corrosion present. For the zinc oxalate, the scribe is grayish. For the blend, the scribe is still shiny, similar to the primer-only (gray) panels. For the blend in FIG. 3, the synergistic performance can best be seen by looking at the shininess of the scribes for all the panels, which perform much better in general than in the ASTM B117 test. For the blend, all panels, primer only and with topcoat, the scribes are bright and shiny, which is superior to the control (all grayish scribes) or individual zinc compounds (all gray for the zinc oxalate set and gray for the zinc citrate top-coated panel).

FIG. 2 shows the performance of LP-6 aluminum rich primer by itself and with various zinc dicarboxylate compounds after 3 weeks in ASTM B117 (from left to right in top row: LP6-F control (no inhibitors), LP6-F with zinc citrate; bottom row: LP6-F with zinc oxalate, LP6-F with blend of zinc oxalate and zinc citrate.

FIG. 3 shows the performance of LP6-F aluminum rich primer by itself and with various zinc dicarboxylate compounds after 3 weeks in GMW 14872 (from left to right in top row: LP6-F control (no inhibitors), LP6-F with zinc citrate; bottom row: LP6-F with zinc oxalate, LP6-F with blend of zinc oxalate and zinc citrate).

As illustrated in FIGS. 1, 2 and 3 and in Tables 1-3 the corrosion-resistant inhibitors consist essentially of synergistic combinations of (A) at least one metal polycarboxylate derived from a stoichiometric reaction of metal compounds and polycarboxylic acids to obtain polycarboxylic metal salts and (B) at least one metal polycarboxylate derived from a stoichiometric reaction of metal compounds and polycarboxylic acids to obtain polycarboxylic metal salts, wherein either the metal or the polycarboxylic acid in at least one of the polycarboxylic metal salt combinations is different from the other combination of polycarboxylic metal salts. For example, where the corrosion-resistant synergistic combination consist of from about 0.1 to 20 parts by weight of zinc oxalate and from about 0.1 to 20 parts by weight of zinc citrate, it is essential that either the zinc or the polycarboxylic acid of the polycarboxylic metal salt of either paragraph (A) or (B) be different. It is essential that where the carboxylic metal salts are derived from the stoichiometric reaction of several different metal compounds and several different polycarboxylic acids, it is essential that at least one of the polycarboxylic metal salts has a different anion or cation from any of the other polycarboxylic metal salt.

A variety of metals such as steel, aluminum and metal alloys can be protected by using the synergistic compositions and methods of this invention. The present invention relates to coating the metals with compositions comprising the synergistic metal polycarboxylates. The metals to be protected may be part of a structure made of a number of different parts which include different metals in contact with each other. At the point of contact of the different metals is the point of galvanic corrosion. The use of the synergistic polycarboxylic metal salts of this invention in a binder or coating composition allows the corrosion-inhibiting compositions to be applied on substrates of different metals while improving the corrosion resistance of one metal without increasing the corrosion of a different metal component. The method comprises using a binder or coating on the metal which includes an effective amount of the synergistic polycarboxylic metal salts. The coatings can include organic systems such as a simple binder or an organic coating including paints and various other known metal inorganic or organic coatings.

For example, the binder or coating can range from about 50 to 99% or parts by weight of the total composition and the synergistic polycarboxylic metal salts can range from about 0.1 to 10% or 1.0-3.0% by weight of the coating. The coatings include inorganic, polymeric or organic binders, such as paints, lubricants, oils, greases and the like.

Suitable polyisocyanate polymers or prepolymers, include, for example, aliphatic polyisocyanate prepolymers, such as 1,6-hexamethylene diisocyanate homopolymer ("HMDI") trimer, and aromatic polyisocyanate prepolymers, such as 4,4'-methylenediphenylisocyanate ("MDI") prepolymer and combinations of two or more aliphatic polyisocyanate pre-polymers.

A preferred binder for the synergistic metal carboxylate salts comprise the polyurethanes, and more particularly the aliphatic polyurethanes derived from the reaction of polyols and multifunctional aliphatic isocyanates and the precursors of the urethanes. Preferred polyisocyanates include hexamethylene diiocyanate and methylene-bis-(4-cyclohexyl isocyanate) DESMODUR-N. By selecting the proper polyols and by adjusting the NCO to OH ratio, the physical properties and efficiency of the film such as the strength of film, flexibility and solvent resistance can be controlled.

Other binders include the polymers or epoxy prepolymers, for example, any epoxy resin, including at least one multifunctional epoxy resin. Examples of epoxy resins comprise polyglycidyl ethers of pyrocatechol, resorcinol hydroquinone and 4,4'-dihydroxydiphenyl methane. Among the commercially available epoxy resins are polyglycidyl derivatives of phenolic compounds, such as the tradenames EPON 828, EPON 1001 and EPON 1031.

While this invention has been described by a number of specific examples, it is obvious that there are other variations and modifications which can be made without departing from the spirit and scope of the invention as particularly set forth in the appended claims.

The invention claimed:

1. The process for treating metal to improve the metal's corrosion-resistance comprising coating the metal with a binder containing an effective amount of a corrosion-resistant inhibitor consisting essentially of a synergistic combination of at least one metal polycarboxylate derived from the stoichiometric reaction of a zinc compound and a diphenic acid to obtain the polycarboxylic metal salt;

and at least one metal polycarboxylate derived from the stoichiometric reaction of a magnesium compound and succinic acid to obtain the polycarboxylic metal salt, wherein either the metal or the polycarboxylic acid in at least one of the polycarboxylic metal salts is different from the other carboxylic metal salts.

2. The process for treating metal to improve the metal's corrosion-resistance comprising coating the metal with a binder containing an effective amount of a corrosion-resistant inhibitor consisting essentially of a synergistic combination of at least one metal polycarboxylate derived from the stoichiometric reaction of a calcium compound and a diphenic acid to obtain a polycarboxylic metal salt;

and at least one metal polycarboxylate derived from the stoichiometric reaction of a zinc compound and a succinic acid to obtain a polycarboxylic metal salt, wherein either the metal or the polycarboxylic acid in at least one of the polycarboxylic metal salts is different from the other polycarboxylic metal salts.

* * * * *